US012539808B2

United States Patent
Okumura et al.

(10) Patent No.: US 12,539,808 B2
(45) Date of Patent: Feb. 3, 2026

(54) VEHICLE EXTERIOR COMPONENT AND EXTERIOR STRUCTURE OF VEHICLE

(71) Applicant: TOYODA GOSEI CO., LTD., Kiyosu (JP)

(72) Inventors: Koji Okumura, Kiyosu (JP); Shintaro Okawa, Kiyosu (JP); Hirotaka Fukui, Kiyosu (JP); Hiroaki Ando, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/001,815

(22) Filed: Dec. 26, 2024

(65) Prior Publication Data
US 2025/0229703 A1 Jul. 17, 2025

(30) Foreign Application Priority Data
Jan. 17, 2024 (JP) .................................. 2024-005170

(51) Int. Cl.
*B60Q 1/50* (2006.01)
*B60Q 1/26* (2006.01)
*B60Q 1/28* (2006.01)

(52) U.S. Cl.
CPC ............. *B60Q 1/5035* (2022.05); *B60Q 1/28* (2013.01); *B60Q 1/2696* (2013.01)

(58) Field of Classification Search
CPC ....... B60Q 1/2696; B60Q 1/28; B60Q 1/5035
See application file for complete search history.

(56) References Cited

U.S. PATENT DOCUMENTS

2008/0253140 A1* 10/2008 Fleischmann .......... G02B 6/006
29/832
2009/0225561 A1* 9/2009 Kleber .................... G09F 21/10
362/505

(Continued)

FOREIGN PATENT DOCUMENTS

JP  2001-347539 A  12/2001
JP  2005-319585 A  11/2005

(Continued)

OTHER PUBLICATIONS

Office Action dated Jun. 17, 2025 in counterpart Japanese Patent Application No. 2024-005170 (and English machine translation).

(Continued)

*Primary Examiner* — Thomas M Sember
(74) *Attorney, Agent, or Firm* — Posz Law Group, PLC (57) ABSTRACT

A vehicle exterior component includes a light source and a cover panel that covers the light source. The cover panel includes a substrate layer, a light-blocking layer and a non-light-blocking layer arranged side by side in a planar direction, and a colored layer located outward from the light-blocking and non-light-blocking layers. A region of the cover panel that overlaps the non-light-blocking layer and is located outward from the non-light-blocking layer forms a light-transmitting portion through which visible light emitted from the light source passes. A region of the cover panel that overlaps the light-blocking layer and is located outward from the light-blocking layer forms a non-light-transmitting portion through which the visible light emitted from the light source does not pass. When the light source is off, a color difference ΔE in an external appearance between the light-transmitting portion and the non-light-transmitting portion is less than or equal to 5.

7 Claims, 5 Drawing Sheets

(56) References Cited

U.S. PATENT DOCUMENTS

| | | | |
|---|---|---|---|
| 2014/0254186 A1 | 9/2014 | Terai et al. | |
| 2023/0256899 A1* | 8/2023 | Hwang | B60R 19/52 362/92 |
| 2023/0304642 A1 | 9/2023 | Sato et al. | |
| 2025/0026264 A1* | 1/2025 | Aoyama | F21S 43/14 |

FOREIGN PATENT DOCUMENTS

| | | |
|---|---|---|
| JP | 2012-210861 A | 11/2012 |
| JP | 2022-035593 A | 3/2022 |
| JP | 2023-080496 A | 6/2023 |
| WO | 2010/147720 A1 | 12/2010 |

OTHER PUBLICATIONS

Office Action mailed on Nov. 4, 2025 issued in corresponding Japanese patent application No. 2024-005170 (and English translation).

* cited by examiner

VEHICLE EXTERIOR COMPONENT AND EXTERIOR STRUCTURE OF VEHICLE

CROSS-REFERENCE TO RELATED APPLICATIONS

This application is based upon and claims the benefit of priority from prior Japanese Patent Application No. 2024-005170, filed on Jan. 17, 2024, the entire contents of which are incorporated herein by reference.

BACKGROUND

1. Field

The present disclosure relates to a vehicle exterior component and an exterior structure of a vehicle.

2. Description of Related Art

Generally, illuminated grilles are known as front grilles that form part of the exterior structure of a vehicle (see, for example, Japanese Laid-Open Patent Publication No. 2022-35593). Such illuminated grilles include a light-transmissive outer cover and a light-emitting element arranged inside the outer cover. The illuminated grille emits light at night as the light from the light-emitting element passes through the outer cover.

Typically, illuminated grilles are not lit during the day. When the illuminated grille is not emitting light, external light such as sunlight causes part of the light to pass through the outer cover, while the rest is reflected by the outer cover. The hood adjacent to the illuminated grille on the vehicle reflects most of the external light, such as sunlight, when exposed to that light. As a result, the illuminated grille and the hood have a noticeably different external appearance, thereby adversely affecting the external appearance of the vehicle.

This issue is not limited to the exterior structure of the vehicle but is generally common to vehicle exterior components that include a non-light-transmitting portion, which does not transmit light, and a light-transmitting portion, which transmits light, arranged around the non-light-transmitting portion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A vehicle exterior component according to an aspect of the present disclosure includes a light source configured to emit visible light and a cover panel that covers the light source. The cover panel includes a substrate layer that transmits the visible light and a light-blocking layer and a non-light-blocking layer that are located outward or inward from the substrate layer. The light-blocking layer and the non-light-blocking layer are arranged side by side in a planar direction. The cover panel also includes a colored layer located outward from the light-blocking layer and the non-light-blocking layer. A region of the cover panel that overlaps the non-light-blocking layer and is located outward from the non-light-blocking layer forms a light-transmitting portion through which the visible light emitted from the light source passes. A region of the cover panel that overlaps the light-blocking layer and is located outward from the light-blocking layer forms a non-light-transmitting portion through which the visible light emitted from the light source does not pass. When the light source is off, a color difference $\Delta E$ in an external appearance between the light-transmitting portion and the non-light-transmitting portion is less than or equal to 5.

An exterior structure of a vehicle according to an aspect of the present disclosure includes a first exterior component and a second exterior component that is located around the first exterior component. The first exterior component is the vehicle exterior component. The second exterior component includes a colored layer having the same configuration as the colored layer of the first exterior component.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A first embodiment will now be described with reference to the drawings.

Configuration of Vehicle 11

Figure 1:
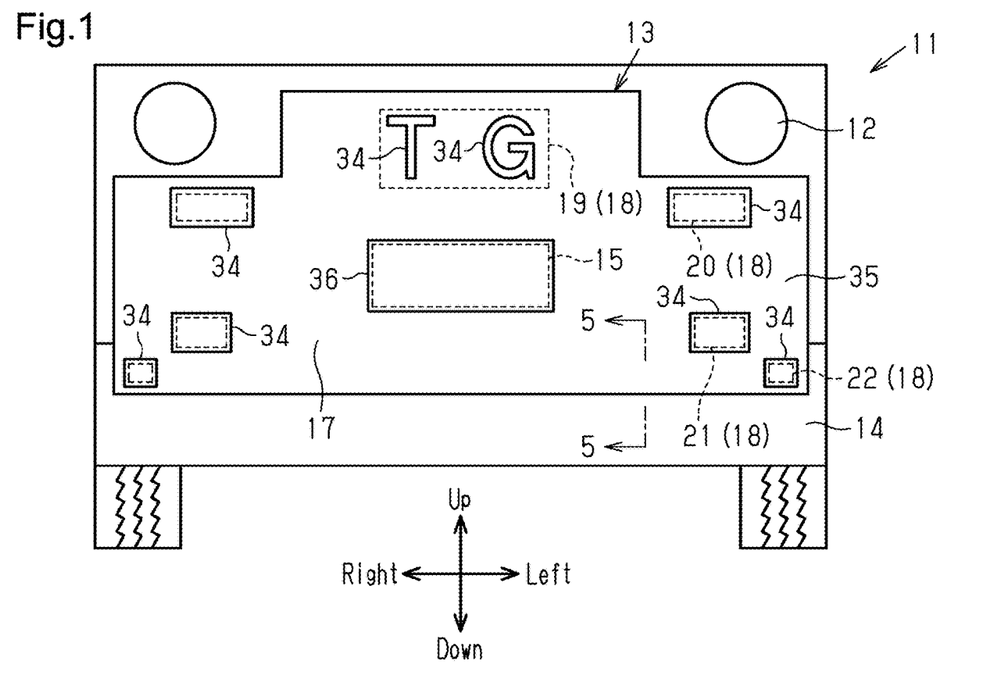
FIG. 1 is a schematic front view showing the front section of a vehicle according to a first embodiment.

As shown in FIG. 1, the front section of a vehicle 11 includes right and left headlights 12, an illuminated grille 13 as an example of a first exterior component (vehicle exterior component), and a front bumper 14 as an example of a second exterior component. The headlights 12 are located at the upper part of the front section of the vehicle 11. The front bumper 14 is located at the lower part of the front section of the vehicle 11.

The illuminated grille 13 is located above and adjacent to the front bumper 14 at the front section of the vehicle 11. That is, the front bumper 14 is located around the illuminated grille 13. The illuminated grille 13 occupies the majority of the area in the front section of the vehicle 11 excluding the headlights 12, which are located above the front bumper 14. The illuminated grille 13 and the front bumper 14 in the present embodiment form an exterior structure of the vehicle 11.

Figure 2:
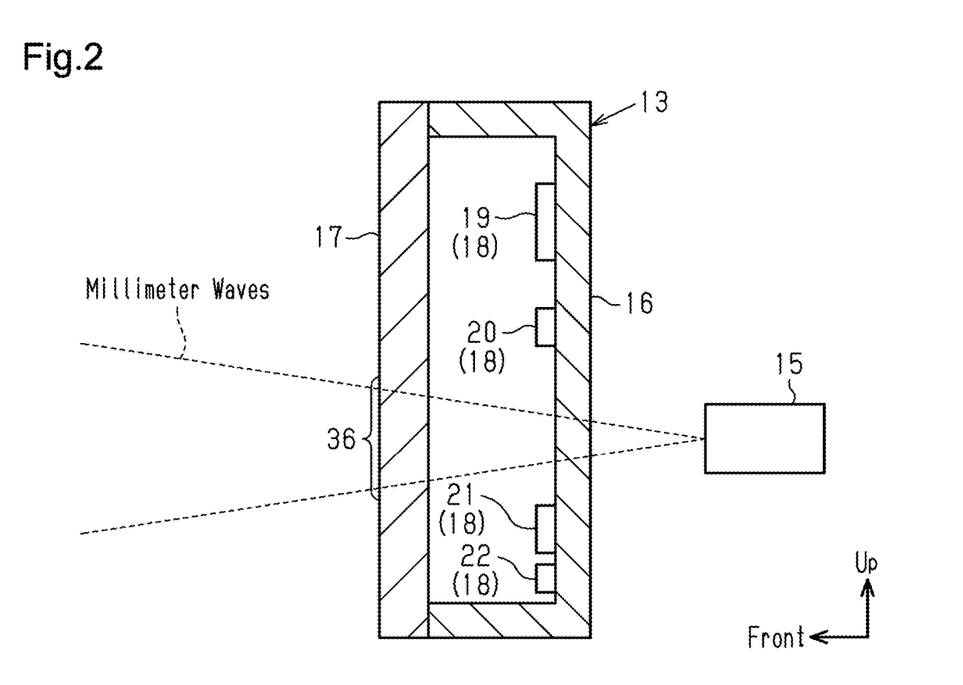
FIG. 2 is a schematic side cross-sectional view showing the illuminated grille.

As shown in FIGS. 1 and 2, a millimeter wave sensor 15 is located on the rear side of the middle part of the illuminated grille 13 at the front section of the vehicle 11. The millimeter wave sensor 15 transmits millimeter waves, a type of electromagnetic wave, toward the front of the vehicle 11 and receives the millimeter waves reflected from external objects, including preceding vehicles and pedestrians.

The millimeter wave sensor 15 recognizes the external objects based on the emitted and received millimeter waves, and detects the distance, the relative speed, and the like between the vehicle 11 and each object. Millimeter waves are radio waves with wavelengths in a range of 1 mm to 10 mm and frequencies in a range of 30 GHz to 300 GHz. The millimeter wave sensor 15 is characterized by being resistant to adverse weather conditions such as rain, fog, and snow, and having a longer detectable distance than infrared sensors.

Illuminated Grille 13

As shown in FIGS. 1 and 2, the illuminated grille 13 includes a box-shaped case 16 with a closed end and an open front end, and a cover panel 17 that closes the open end of the case 16. The bottom surface in the case 16 has a light source 18 configured to emit visible light. The light source 18 is located to face the cover panel 17 in the front-rear direction. Thus, the cover panel 17 covers the light source 18 from the front. In the present embodiment, the light source 18 is, for example, a light emitting diode (LED) that emits white visible light.

The light source 18 includes a decorative lamp 19, left and right daytime running lamps (DRL) 20, left and right turn lamps 21 (direction indicators), and left and right position lamps 22 (side marker lamps). The case 16 is made of synthetic resin materials such as polycarbonate (PC) and polypropylene (PP).

Cover Panel 17

Figure 3:
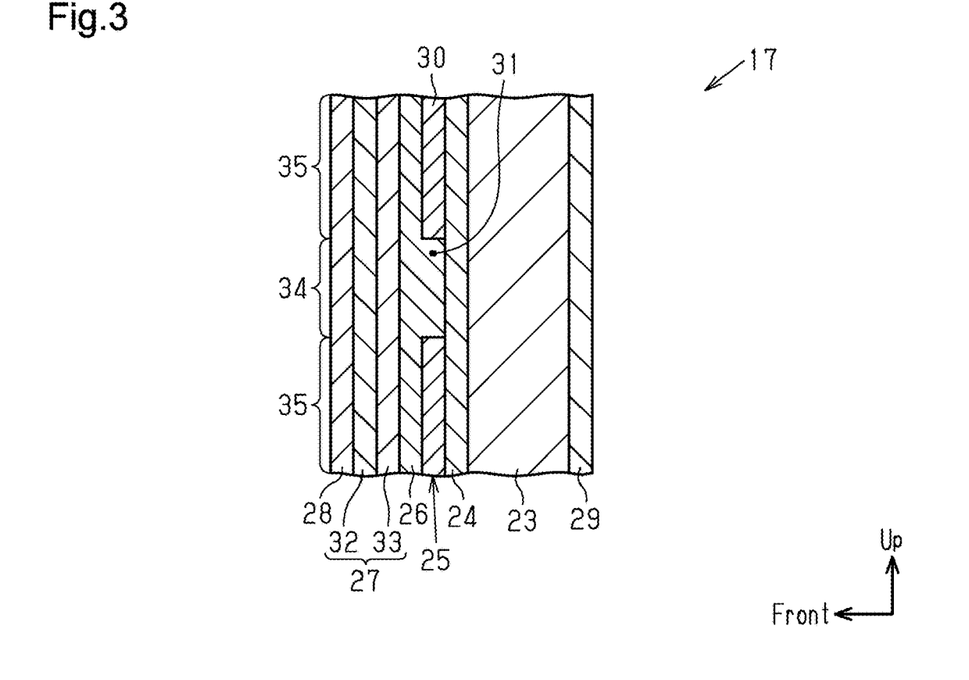
FIG. 3 is a schematic cross-sectional view showing a part of the cover panel.

As shown in FIG. 3, the cover panel 17 includes layers laminated in the front-rear direction. Each layer of the cover panel 17 has an outer surface, as a front surface, and an inner surface, as a rear surface.

The cover panel 17 includes a substrate layer 23, an adhesive layer 24 on the front surface of the substrate layer 23, a light-adjusting layer 25 on the front surface of the adhesive layer 24, a first color-complementary layer 26 on the front surface of the light-adjusting layer 25, a colored layer 27 on the front surface of the first color-complementary layer 26, a protective layer 28 on the front surface of the colored layer 27, and an anti-fog layer 29 on the rear surface of the substrate layer 23.

The substrate layer 23 is made of a synthetic resin that transmits visible light, and thus transmits visible light. The substrate layer 23 is made of material such as polycarbonate (PC) or polypropylene (PP). The adhesive layer 24 is transparent to allow the transmission of visible light. The adhesive layer 24 is formed by, for example, a primer, an adhesive, or a buffer layer (cushion layer). The light-adjusting layer 25 includes a light-blocking layer 30, which blocks visible light, and a non-light-blocking layer 31, which does not block visible light.

The light-adjusting layer 25 is structured such that the light-blocking layer 30 and the non-light-blocking layer 31 are arranged side by side in the planar direction. The light-blocking layer 30 is formed by a coating film that does not transmit visible light, such as a black coating film. The non-light-blocking layer 31 is formed by a region (space) in which the light-blocking layer 30 is absent within the light-adjusting layer 25. Thus, the non-light-blocking layer 31, having no physical substance, allows the transmission of visible light.

The first color-complementary layer 26 functions to adjust the emission state of visible light emitted from the light source 18 at night, and adjust the external color appearance of the cover panel 17 during the day when visible light is not emitted from the light source 18. The colored layer 27 is formed by a coating film that allows the transmission of visible light. That is, the colored layer 27 has, for example, a two-layer structure consisting of a colored clear layer 32 and a colored pearl layer 33 laminated on the rear surface of the colored clear layer 32.

The colored clear layer 32 is formed by a coating film with a translucent appearance. The colored pearl layer 33 is formed by a coating film that contains pearlescent pigments, which are made of mica coated with, for example, titanium dioxide or metal oxides. The protective layer 28 functions to protect the colored layer 27 from being scratched. The protective layer 28 is formed by, for example, a transparent clear coating or a transparent hard coat layer. The anti-fog layer 29 functions to suppress fog formation.

The region of the cover panel 17 that overlaps the non-light-blocking layer 31 in the front-rear direction and is located frontward from the non-light-blocking layer 31 forms a light-transmitting portion 34 through which the visible light emitted from the light source 18 passes. The region of the cover panel 17 that overlaps the light-blocking layer 30 in the front-rear direction and is located frontward from the light-blocking layer 30 forms a non-light-transmitting portion 35 through which the visible light emitted from the light source 18 does not pass.

As shown in FIGS. 1 to 3, the cover panel 17 includes the light-transmitting portion 34 in a region that faces the light source 18 in the front-rear direction. That is, the cover panel 17 includes the light-transmitting portion 34 in a region that faces, in the front-rear direction, each of the decorative lamp 19, the left and right DRLs 20, the left and right turn lamps 21, and the left and right position lamps 22. In this case, the light-transmitting portion 34, which is provided in a region of the cover panel 17 that faces the decorative lamp 19 in the front-rear direction, is shaped to form the letters "TG," for example.

The transmittance of visible light from the light source 18, in a region of the cover panel 17 that includes the non-light-blocking layer 31 and overlaps the non-light-blocking layer 31 in the front-rear direction, is set so as to range between 5% and 70%, inclusive. All of the region in the external appearance of the cover panel 17 except for the light-transmitting portion 34 is the non-light-transmitting portion 35.

The colored layer 27 in the cover panel 17 has the same configuration in the light-transmitting portion 34 and the non-light-transmitting portion 35. That is, the same coating material is used for the light-transmitting portion 34 and the non-light-transmitting portion 35 of the colored layer 27 in the cover panel 17. The illuminated grille 13 is configured such that, when the light source 18 is off, a color difference ΔE in the external appearance between the light-transmitting portion 34 and the non-light-transmitting portion 35 of the cover panel 17 is less than or equal to 5.

The cover panel 17 includes an electromagnetic wave transmission portion 36 that allows electromagnetic waves to pass through. The electromagnetic wave transmission portion 36 in the cover panel 17 allows electromagnetic waves to pass through more easily compared to other portions of the cover panel 17. In the present embodiment, the electromagnetic wave transmission portion 36 is adjusted on the rear surface (inner surface) of the substrate layer 23 such that the thickness of the substrate layer 23 is optimized in accordance with the wavelength of each electromagnetic wave that is transmitted through the substrate layer 23. Examples of the adjustment on the rear surface of the substrate layer 23 include formation of a recess, on the rear surface of the substrate layer 23, recessed from the portions other than the electromagnetic wave transmission portion 36.

The electromagnetic wave transmission portion 36 in the cover panel 17 is arranged in the region facing the millimeter wave sensor 15 in the front-rear direction. The electromagnetic wave transmission portion 36 in the cover panel 17 preferably has an attenuation rate of 3.0 dB or less for a round-trip millimeter wave. When the attenuation rate of a round-trip millimeter wave through the electromagnetic wave transmission portion 36 exceeds 3.0 dB, the detection accuracy of the millimeter wave sensor 15 may be insufficient.

Figure 4:
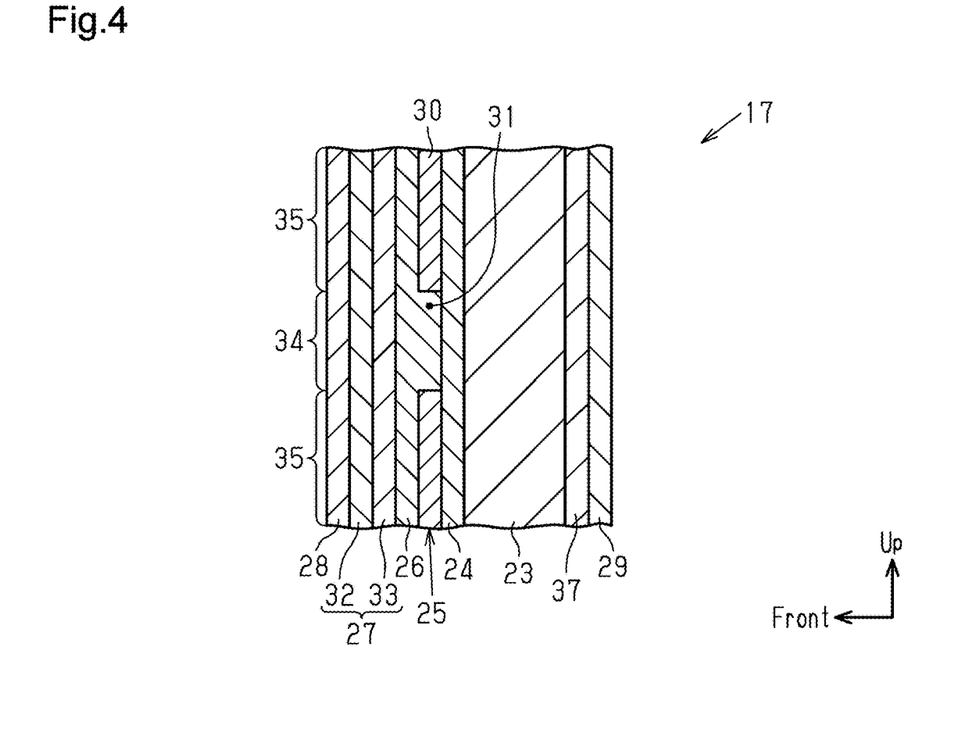
FIG. 4 is a schematic cross-sectional view showing another part of the cover panel.

As shown in FIGS. 1, 2, and 4, the left and right turn lamps 21 in the cover panel 17 face a region in the front-rear direction. In this region, a second color-complementary layer 37 is located between the substrate layer 23 and the anti-fog layer 29. The second color-complementary layer 37 functions to adjust the visible light emitted from the turn lamp 21 (light source 18) to a yellow lamp color (amber color).

Figure 5:
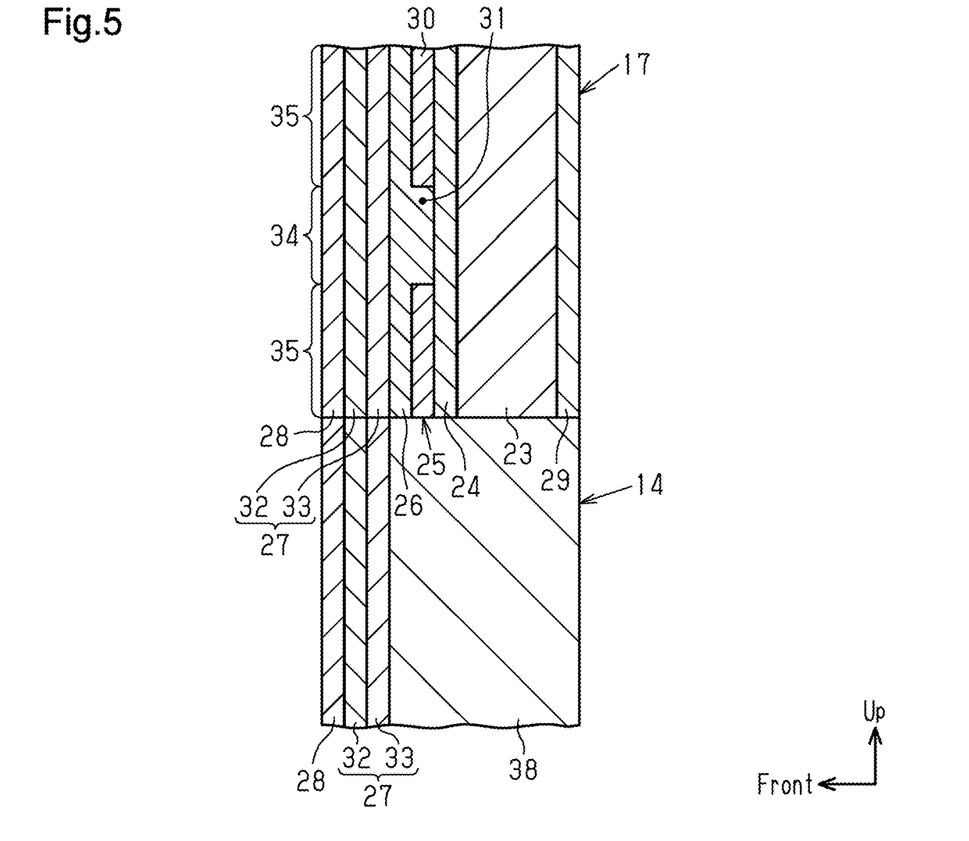
FIG. 5 is a schematic cross-sectional view taken along line 5-5 of FIG. 1.

As shown in FIGS. 1 and 5, the front bumper 14, which is adjacent to the illuminated grille 13, includes a resin substrate 38, the colored layer 27 on the front surface of the resin substrate 38, and the protective layer 28 on the front surface of the colored layer 27. That is, the front bumper 14 includes the colored layer 27, which has the same configuration as the colored layer 27 of the cover panel 17 in the illuminated grille 13.

Operation of First Embodiment

The vehicle 11 typically turns on the decorative lamp 19 during nighttime driving. This emits visible light from the decorative lamp 19 onto the light-transmitting portion 34 of the cover panel 17, which represents the letters "TG." As a result, the letters "TG" are illuminated in white by the visible light passing through the light-transmitting portion 34.

Similarly, the left and right DRLs 20 and the left and right position lamps 22 are turned on. This causes the light-transmitting portion 34 of the cover panel 17, facing these members, to emit white light through the visible light produced by the left and right DRLs 20 and the left and right position lamps 22.

Further, one of the left and right turn lamps 21 is selectively turned on as necessary. This causes the light-transmitting portion 34 of the cover panel 17, facing the selected turn lamp 21, to emit a yellow light through the visible light produced by the selected turn lamp 21.

The vehicle 11 typically turns on only the left and right DRLs 20 during daytime driving. That is, during daytime driving of the vehicle 11, all light sources 18 except for the left and right DRLs 20 are off. In this state, the cover panel 17 is configured such that the color difference ΔE in the external appearance between the light-transmitting portion 34, which faces the light source 18 in the off state, and the non-light-transmitting portion 35 is less than or equal to 5.

As a result, the boundary between the light-transmitting portion 34 and the non-light-transmitting portion 35 in the cover panel 17 is less noticeable. Thus, the external appearance of the cover panel 17 is improved, and consequently, the external appearance of the vehicle 11 is improved.

The millimeter waves (electromagnetic waves) transmitted and received by the millimeter wave sensor 15 pass through the electromagnetic wave transmission portion 36 of the cover panel 17. In this case, the electromagnetic wave transmission portion 36 in the cover panel 17 has an attenuation rate of 3.0 dB or less for a round-trip millimeter wave. Thus, the millimeter wave sensor 15 has a sufficient detection accuracy. Accordingly, the cover panel 17 functions as an electromagnetic wave transmissive cover in a favorable manner.

Advantages of First Embodiment

The first embodiment described above in detail has the following advantages.

(1-1) The illuminated grille 13 includes the light source 18, which is configured to emit visible light, and the cover panel 17, which covers the light source 18. The cover panel 17 includes the substrate layer 23, which transmits visible light, the light-blocking layer 30 and the non-light-blocking layer 31, which are located outward from the substrate layer 23 and arranged side by side in the planar direction, and the colored layer 27, which is located outward from the light-blocking layer 30 and the non-light-blocking layer 31. The region of the cover panel 17 that overlaps the non-light-blocking layer 31 and is located outward from the non-light-blocking layer 31 forms the light-transmitting portion 34, through which the visible light emitted from the light source 18 passes. The region of the cover panel 17 that overlaps the light-blocking layer 30 and is located outward from the light-blocking layer 30 forms the non-light-transmitting portion 35, through which the visible light emitted from the light source 18 does not pass. When the light source 18 is off, the color difference ΔE between the light-transmitting portion 34 and the non-light-transmitting portion 35 is less than or equal to 5.

In this configuration, when the light source 18 is turned on, the visible light from the light source 18 passes through the light-transmitting portion 34 of the cover panel 17 but does not pass through the non-light-transmitting portion 35 of the cover panel 17. This allows only the light-transmitting portion 34 of the cover panel 17 to emit light through the visible light from the light source 18. When the light source 18 is off, the color difference ΔE between the non-light-transmitting portion 35 and the light-transmitting portion 34 of the cover panel 17 is less than or equal to 5. As a result, the boundary between the non-light-transmitting portion 35 and the light-transmitting portion 34 is less noticeable. Accordingly, the external appearance of the cover panel 17 is improved.

(1-2) In the illuminated grille 13, the light source 18 emits visible light in white. The transmittance of visible light in the region of the cover panel 17 of the illuminated grille 13 that includes the non-light-blocking layer 31 and overlaps the non-light-blocking layer 31 ranges between 5% and 70%, inclusive.

In this configuration, the light-transmitting portion 34 emits white visible light in a favorable manner.

(1-3) In the illuminated grille 13, the colored layer 27 has the same configuration in the light-transmitting portion 34 and the non-light-transmitting portion 35.

In this configuration, the cover panel 17 is manufactured more easily compared to when the configuration of the colored layer 27 differs between the light-transmitting portion 34 and the non-light-transmitting portion 35.

(1-4) In the illuminated grille 13, the cover panel 17 includes the electromagnetic wave transmission portion 36, which allows electromagnetic waves to pass through.

This configuration allows the cover panel 17 to be used as an electromagnetic wave transmissive cover that covers the millimeter wave sensor 15.

(1-5) The exterior structure of the vehicle 11 includes the illuminated grille 13 and the front bumper 14, which is arranged around the illuminated grille 13. The front bumper 14 includes the colored layer 27, which has the same configuration as the colored layer 27 of the illuminated grille 13.

In this configuration, the illuminated grille 13 has the same color tone as the front bumper 14, creating a sense of unity in the external appearance of the illuminated grille 13 and the front bumper 14. This contributes to the enhancement of the external appearance of the vehicle 11.

Second Embodiment

A second embodiment will now be described with reference to the drawings.

Figure 6:
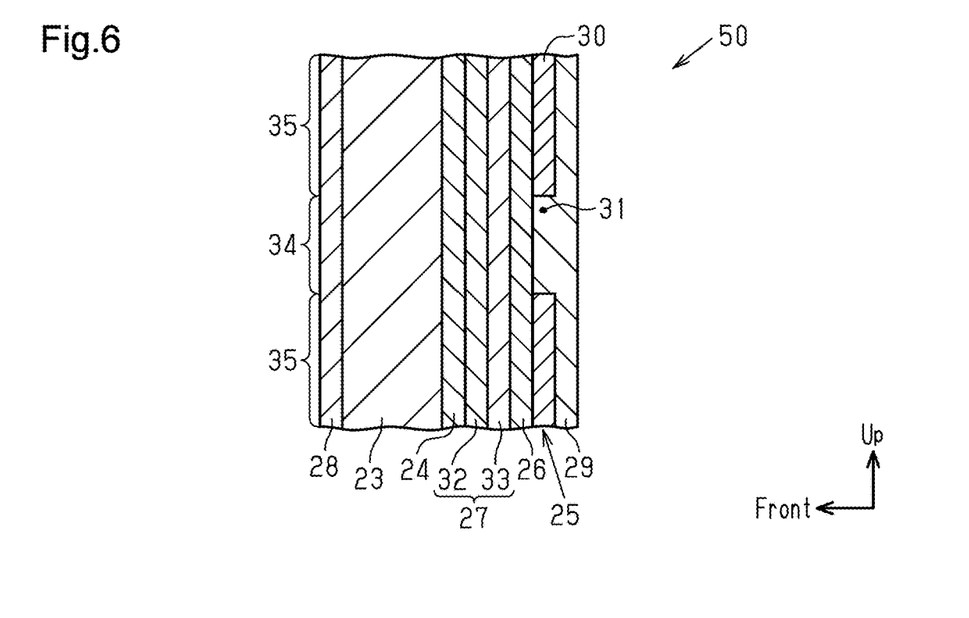
FIG. 6 is a schematic cross-sectional view showing the cover panel according to a second embodiment.

In this second embodiment, the cover panel 17 shown in FIG. 3 of the first embodiment is changed to a cover panel 50 shown in FIG. 6. As shown in FIGS. 3 and 6, the cover panel 50 is different from the cover panel 17 of the first embodiment in that the layers other than the protective layer 28 are arranged on the rear surface of the substrate layer 23. In the second embodiment, the difference from the first embodiment will be described, and redundant descriptions will be omitted. The same reference numerals are given to the components of the second embodiment that are the same as the corresponding components of the first embodiment.

Cover Panel 50

As shown in FIG. 6, the cover panel 50 includes the substrate layer 23, the protective layer 28 on the front surface of the substrate layer 23, the adhesive layer 24 on the rear surface of the substrate layer 23, the colored layer 27 on the rear surface of the adhesive layer 24, the first color-complementary layer 26 on the rear surface of the colored layer 27, the light-adjusting layer 25 on the rear surface of the first color-complementary layer 26, the anti-fog layer 29 on the rear surface of the light-adjusting layer 25.

Method for Manufacturing Cover Panel 50

Figure 7:
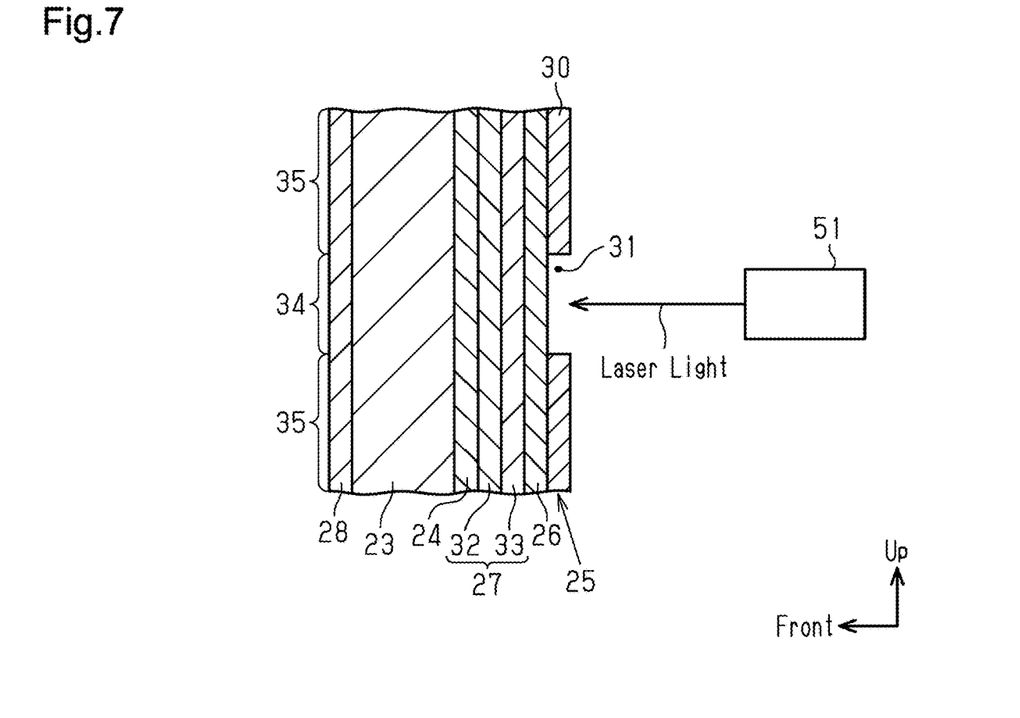
FIG. 7 is a schematic cross-sectional view showing the state during the manufacturing of the cover panel.

As shown in FIG. 7, when manufacturing the cover panel 50, first, the protective
layer 28 is provided on the front surface of the substrate layer 23. Subsequently, the adhesive layer 24, the colored layer 27, and the first color-complementary layer 26 are sequentially laminated on the rear surface of the substrate layer 23. Then, the light-blocking layer 30 is provided on the entire rear surface of the first color-complementary layer 26. Next, to form the light-transmitting portion 34 in the region of the light-blocking layer 30 that faces the light source 18 in the front-rear direction, the non-light-blocking layer 31 is formed. This provides the light-adjusting layer 25, which includes the light-blocking layer 30 and the non-light-blocking layer 31, on the rear surface of the first color-complementary layer 26.

In this case, the non-light-blocking layer 31 is formed through laser etching, where a laser emitter 51 emits laser light from the rear side to the light-blocking layer 30, partially removing the light-blocking layer 30. Subsequently, the anti-fog layer 29 is provided on the rear surface of the light-adjusting layer 25, resulting in the manufacturing of the cover panel 50 as shown in FIG. 6.

Advantages of Second Embodiment

The second embodiment described above in detail has the following advantage in addition to advantages (1-1) to (1-5).

(2-1) In the cover panel 50, the non-light-blocking layer 31 is formed by partially removing the light-blocking layer 30 from the rear side through, for example, laser etching. This facilitates the formation of the light-adjusting layer 25 and consequently facilitates the manufacturing of the cover panel 50.

Modifications

The above-described embodiments may be modified as follows. The above-described embodiments and the following modifications can be combined as long as the combined modifications remain technically consistent with each other.

Figure 8:
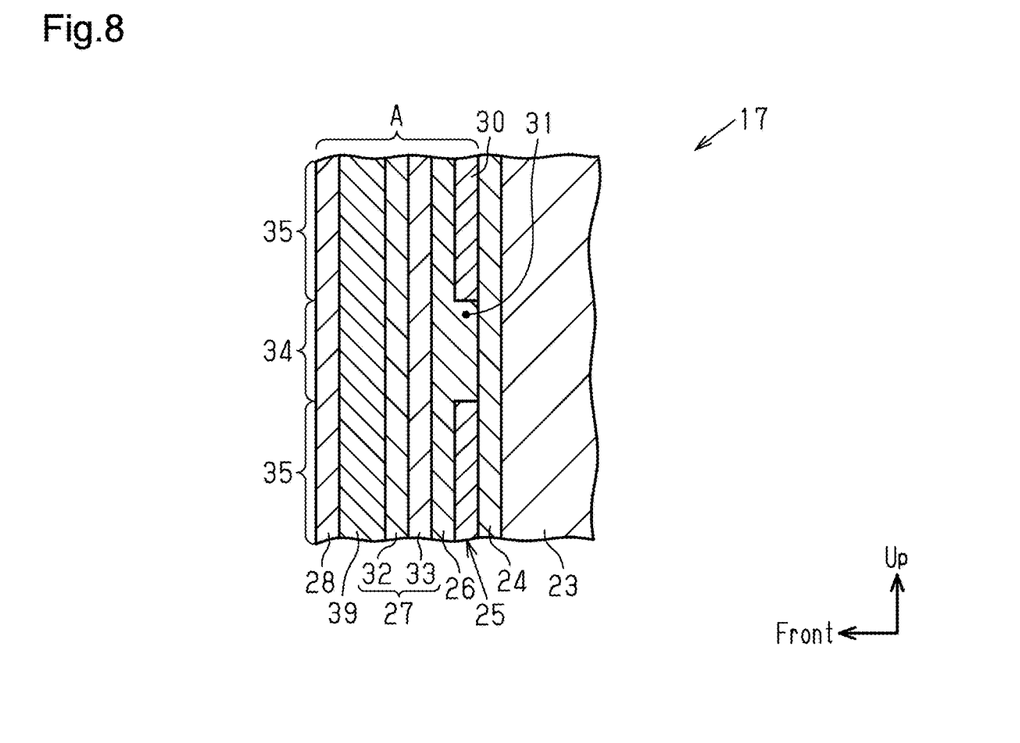
FIG. 8 is a schematic cross-sectional view showing the cover panel according to a modification.

As shown in FIG. 8, the cover panel 17 may include a film substrate 39 that transmits visible light and is located between the protective layer 28 and the colored layer 27. In this case, the protective layer 28, the film substrate 39, the colored layer 27, the first color-complementary layer 26, and the light-adjusting layer 25 are integrally formed as a laminated unit A. Thus, the laminated unit A is adhered to the substrate layer 23 with the adhesive layer 24 in between, facilitating the manufacturing of the cover panel 17. The film substrate 39 may be made of, for example, polymethyl methacrylate (PMMA) resin or polycarbonate (PC).

Figure 9:
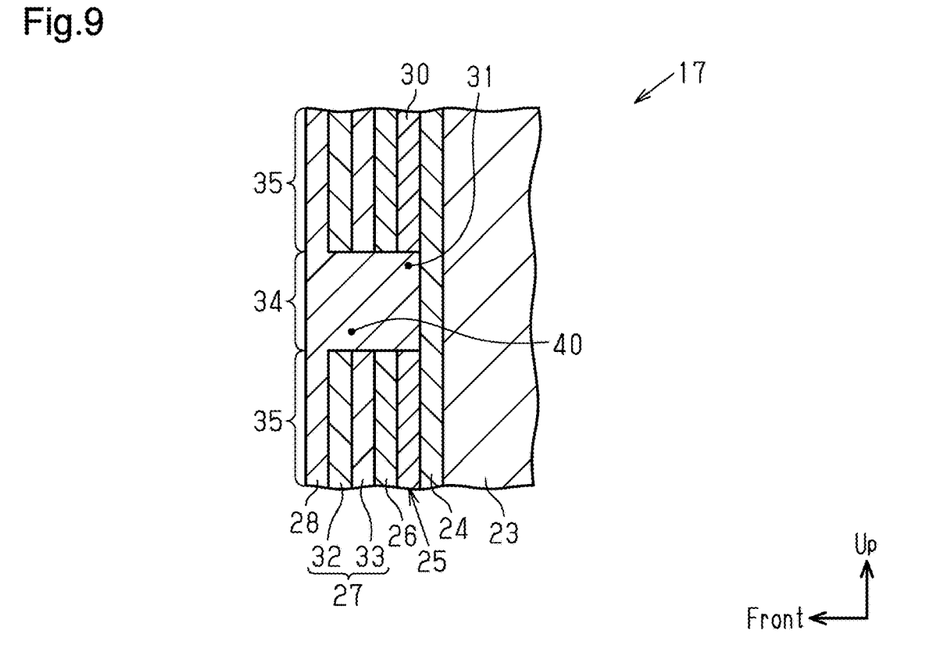
FIG. 9 is a schematic cross-sectional view showing the cover panel according to another modification.

As shown in FIG. 9, part of the light-transmitting portion 34 of the cover panel 17 includes a non-colored portion 40, where the colored layer 27 is not arranged. In this case, a portion corresponding to the non-colored portion 40 in the first color-complementary layer 26 is omitted. Thus, the non-colored portion 40 is provided in the light-transmitting portion 34 of the cover panel 17, which faces the turn lamps 21 and the DRLs 20. This configuration increases the luminous intensity of the visible light passing through the light-transmitting portion 34 from the turn lamps 21 and the DRLs 20.

Figure 10:
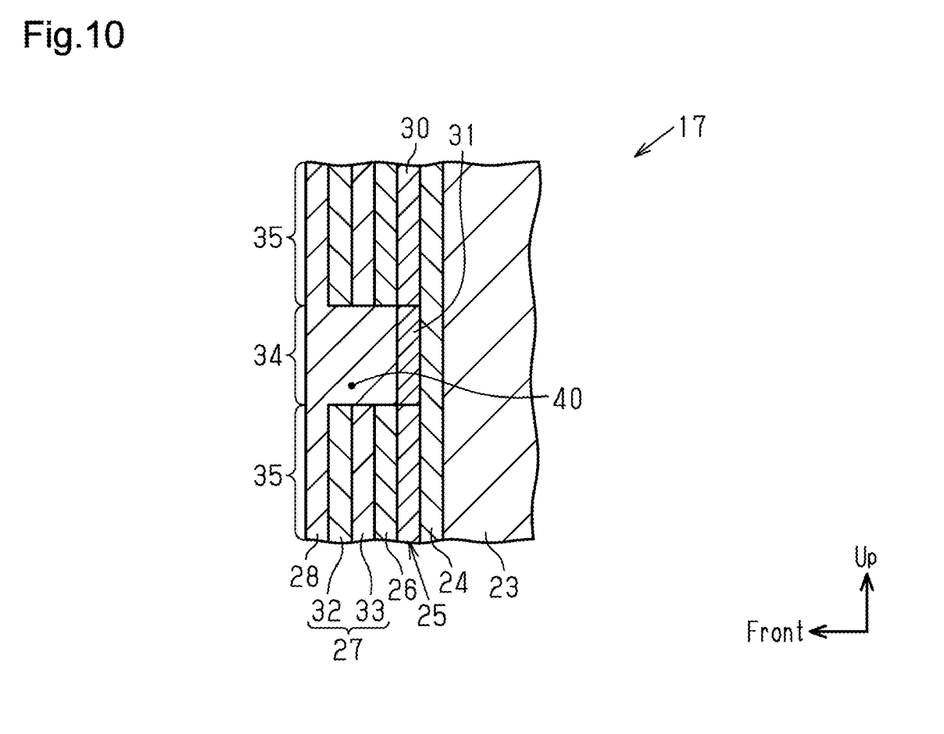
FIG. 10 is a schematic cross-sectional view showing the cover panel according to a further modification.

As shown in FIG. 10, in the cover panel 17 of FIG. 9, the non-light-blocking layer 31 may be formed by creating apertures in the light-blocking layer 30. That is, the non-light-blocking layer 31 may be formed by a structure that has apertures extending through the light-blocking layer 30 in the front-rear direction. In this configuration, the parts of the non-light-blocking layer 31 other than the apertures make the substrate layer 23 less visible from the outside through the non-colored portion 40 of the light-transmitting portion 34 of the cover panel 17. This configuration also ensures that the apertures in the non-light-blocking layer 31 transmit visible light.

The front bumper 14 does not need to include the colored layer 27 of the same configuration as that of the illuminated grille 13.

The cover panel 17 does not need to include the electromagnetic wave transmission portion 36.

In the illuminated grille 13, the colored layer 27 does not need to have the same configuration in the light-transmitting portion 34 and the non-light-transmitting portion 35.

In the illuminated grille 13, the light source 18 does not need to emit the visible light in white.

The transmittance of visible light in the region of the cover panel 17 of the illuminated grille 13 that includes the non-light-blocking layer 31 and overlaps the non-light-blocking layer 31 does not need to range between 5% and 70%, inclusive.

The second color-complementary layer 37 may be omitted. In this case, the visible light emitted from the turn lamp 21 and transmitted through the light-transmitting portion 34 of the cover panel 17 is adjusted by the turn lamp 21 to have a yellow light color (amber).

Instead of the colored pearl layer 33, the colored layer 27 may use a metallic coating layer containing aluminum flakes or a solid coating layer that does not contain aluminum flakes or pearlescent pigments. Alternatively, the colored layer 27 may use a coating layer that has the same color as exterior components, such as the bumper cover and fender panel of the vehicle 11.

The colored layer 27 may have a single-layer structure or have a structure with three or more layers.

In the cover panel 17, the anti-fog layer 29 may be omitted.

In the cover panel 17, the adhesive layer 24 may be omitted.

In the cover panel 17, the first color-complementary layer 26 may be omitted.

In the cover panel 17, the protective layer 28 may be omitted.

The electromagnetic wave transmission portion 36 of the cover panel 17 may be configured such the colored pearl layer 33, which is included in the colored layer 27, is thinner than the parts of the cover panel 17 other than the electromagnetic wave transmission portion 36. In this case, the colored pearl layer 33 is formed by a coating film that includes pearlescent pigments, which impede the transmission of electromagnetic waves. Thus, the thinner the colored pearl layer 33, the more easily electromagnetic waves can pass through.

Instead of, or in addition to the millimeter wave sensor 15, an infrared sensor may be arranged on the rear side of the illuminated grille 13. Of electromagnetic waves, the infrared sensor transmits infrared rays (near-infrared rays) toward the front of the vehicle 11, each of which has a wavelength of between 900 nm and 2000 nm, inclusive, and receives the infrared rays that have struck and have been reflected by external objects including preceding vehicles and pedestrians. The infrared sensor recognizes the external objects based on the emitted and received infrared rays, and detects the distance, the relative speed, and the like between the vehicle 11 and each object. The infrared sensor is capable of detecting objects that are smaller than those detectable by the millimeter wave sensor 15.

The vehicle exterior component (first exterior component) may be a vehicle exterior component other than the illuminated grille 13.

The second exterior component may be, for example, a fender panel of the vehicle 11.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle exterior component, comprising:
   a light source configured to emit visible light; and
   a cover panel that covers the light source, wherein
   the cover panel includes:
      a substrate layer that transmits the visible light;
      a light-blocking layer and a non-light-blocking layer that are located outward or inward from the substrate layer, the light-blocking layer and the non-light-blocking layer being arranged side by side in a planar direction; and
      a colored layer located outward from the light-blocking layer and the non-light-blocking layer,
   a region of the cover panel that overlaps the non-light-blocking layer and is located outward from the non-light-blocking layer forms a light-transmitting portion through which the visible light emitted from the light source passes,
   a region of the cover panel that overlaps the light-blocking layer and is located outward from the light-blocking layer forms a non-light-transmitting portion through which the visible light emitted from the light source does not pass,
   when the light source is off, a color difference ΔE in an external appearance between the light-transmitting portion and the non-light-transmitting portion is less than or equal to 5, and
   the colored layer has a two-layer structure including a colored clear layer and a colored pearl layer laminated on a rear surface of the colored clear layer.

2. The vehicle exterior component according to claim 1, wherein
   the light source emits the visible light in white, and
   a transmittance of the visible light in a region of the cover panel that includes the non-light-blocking layer and overlaps the non-light-blocking layer ranges between 5% and 70%, inclusive.

3. The vehicle exterior component according to claim 1, wherein
   the colored layer is formed from a same coating material in the light-transmitting portion and the non-light-transmitting portion.

4. The vehicle exterior component according to claim 1, wherein
   part of the light-transmitting portion includes a non-colored portion where the colored layer is not arranged.

5. The vehicle exterior component according to claim 4, wherein
   the non-light-blocking layer includes apertures extending through the light-blocking layer in a front-rear direction, and the non-colored portion is provided corresponding to the apertures.

6. The vehicle exterior component according to claim 1, wherein the cover panel includes an electromagnetic wave transmission portion that allows electromagnetic waves to pass through.

7. An exterior structure of a vehicle, the exterior structure comprising:

a first exterior component; and a second exterior component that is located around the first exterior component, wherein the first exterior component is the vehicle exterior component according to claim 1, the second exterior component includes a colored layer, and the colored layer of the second exterior component and the colored layer of the first exterior component are formed from a same coating material.

* * * * *